Figure 3:
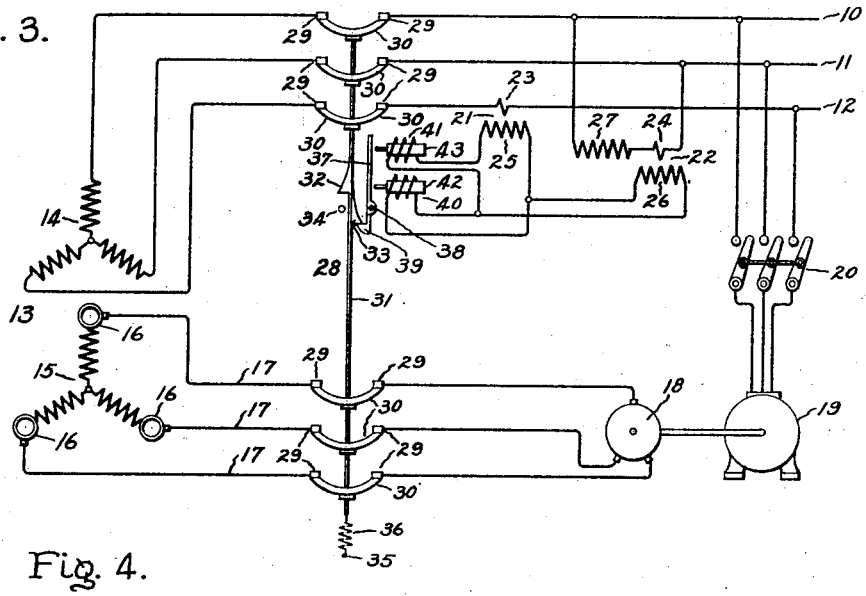

Jan. 3, 1933.   J. I. HULL   1,893,328
CONTROL OF INDUCTION APPARATUS
Filed Oct. 18, 1929

Inventor:
John I. Hull,
by Charles E. Mullen
His Attorney.

Patented Jan. 3, 1933

1,893,328

UNITED STATES PATENT OFFICE

JOHN I. HULL, OF SCHENECTADY, NEW YORK, ASSIGNOR TO GENERAL ELECTRIC COMPANY, A CORPORATION OF NEW YORK

CONTROL OF INDUCTION APPARATUS

Application filed October 18, 1929. Serial No. 400,617.

My invention relates to the control of induction apparatus having two or more inductively related circuits. The principal object of my invention is to produce a control current whose value is such that a substantially constant ratio always exists therebetween and the current flowing through one of the inductively related circuits without making any connections to that circuit for this purpose.

To give a practical example I will describe my invention in connection with an induction motor which consists of two inductively related circuits, but I wish it understood that my invention is equally applicable to any apparatus containing two or more inductively related circuits. It is well known to those skilled in the art that when an induction motor is operated in the usual manner the primary and secondary currents reach their maximum safe values at approximately the same time. It is therefore customary to protect an induction motor operated in the usual manner by means of an overload circuit breaker actuated by a proportionate value of the primary current, thus protecting both the primary and secondary windings.

The demands of modern industry led to the use of an induction motor having its secondary connected to other apparatus so as to obtain various desired results, as for example, efficient speed control of the induction motor, control of the motor power factor, and control of the flow of energy current or wattless current between two interconnected power systems. The flow of energy current or wattless current from the power lines to the motor primary is regulated by the apparatus connected to the motor secondary. With such uses of the induction motor there may arise operating conditions where the primary current reaches its maximum safe value before the secondary current reaches its maximum safe value, or, conversely, where the secondary current reaches its maximum safe value before the primary current reaches its maximum safe value. To protect both the primary and secondary windings under all operating conditions it becomes desirable to operate the overload circuit breaker when either the primary or secondary current has reached its maximum safe value, and this is also true of the operation of any device which brings about the functioning of the apparatus connected to the motor secondary so as to regulate the flow of energy current or wattless current from the power lines to the motor primary. It is evident that the overload circuit breaker or other device should be actuated by two separate currents representing the motor primary current and secondary current respectively.

The motor primary may be protected in the usual manner, as for example, by actuating the overload circuit breaker or other device by the direct value of the motor primary current or by a proportionate value of the motor primary current obtained from the secondary of a current transformer connected in series with the motor primary.

It is impractical to protect the motor secondary by actuating the overload circuit breaker or other device by the direct value of the motor secondary currents since these currents are usually of a large value. In addition, the variation in the frequency of the secondary currents due to the variation in the motor speed may affect the proper operation of the overload circuit breaker or other device whether they are operated by the direct value of the motor secondary currents or by a proportionate value of the motor secondary current obtained from the secondary of a current transformer connected in series with the motor secondary. Furthermore, the construction of the overload circuit breaker or other device will then become complicated because they must be actuated by currents which are substantially directly proportional to the currents of all the motor secondary phases in order to secure proper functioning when the secondary currents have zero frequency. The reason for this may be explained in the following manner. Assuming for example, a three-phase motor secondary, when the secondary currents have zero frequency the phase currents may for example be represented by +100 amperes, zero amperes, and −100 amperes, and it will be impossible to predetermine which phase will have any of the above stated current values. It therefore becomes desirable to protect the motor secondary by actuating the overload circuit breaker or other device by a current whose value is a substantially constant proportion of the motor secondary current irrespective of the value or frequency of the motor secondary currents. This desirable result is accomplished by my invention which will be best understood from the following description when considered in connection with the accompanying drawing while the features of my invention which are believed to be novel and patentable are pointed out in the claims appended hereto.

Figure 4:
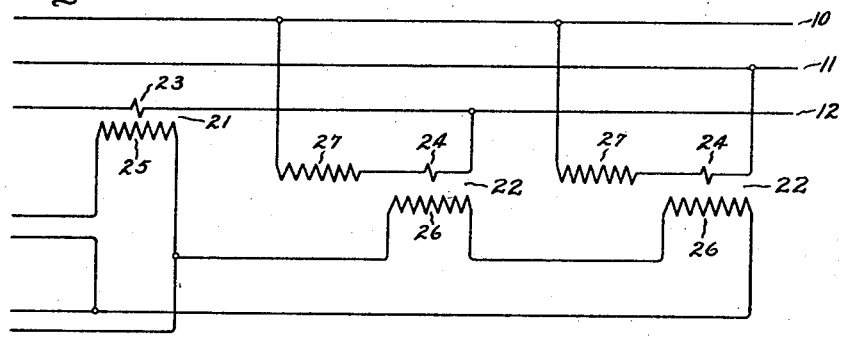
Figure 1:
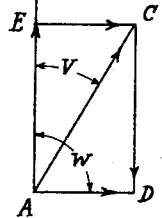
Figure 2:
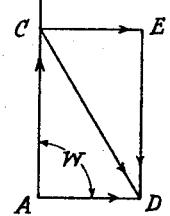

Figs. 1 and 2 represent the vector relation between the primary, secondary and magnetizing currents of an induction motor when operating with a lagging power factor and unity power factor respectively; Fig. 3 represents a preferred embodiment of my invention when used in connection with an overload circuit breaker, and Fig. 4 represents a modification of my invention.

A simple and practical example of the need for my invention may be shown by an induction motor whose secondary is connected to other apparatus that controls the flow of wattless current from the power lines to the motor primary. To prevent complication of the description I will assume that the motor primary and secondary have the same number of turns. It is an inherent characteristic of the induction motor that the energy load ampere turns of the primary and secondary are equal, and as I have assumed them to have an equal number of turns therefore their energy load currents will be equal. It is well known to those skilled in the art that the magnetizing current of an induction motor is practically a wattless current and therefore lags behind the impressed primary voltage by an angle of substantially 90 degrees. This angle of lag remains substantially constant under all load conditions irrespective of whether the magnetizing current is supplied by the primary, secondary, or partly by each.

Fig. 1 represents the vector relation between the primary, secondary and magnetizing currents when the induction motor is operated in the usual manner. AB represents the primary impressed voltage, AC represents the primary current, AD represents the magnetizing current, and CD represents the secondary current. The primary current AC can be divided into the components AE and EC. The component AE represents the energy current to balance the secondary current CD, whereas the component EC is the magnetizing current reproduced as AD to form a closed triangle. As the primary furnishes the magnetizing current therefore the primary current is larger than the secondary current and there is a flow of wattless current from the power lines to the primary causing the motor to operate with a lagging power factor. The primary current AC lags behind the voltage AB by the angle V, whereas the magnetizing current AD lags behind the voltage AB by the angle W.

Fig. 2 represents the vector relation between the primary, secondary and magnetizing currents when the motor is caused to operate at unity power factor by means of the apparatus connected to the motor secondary. AB represents the primary impressed voltage, AC represents the primary current, AD represents the magnetizing current, and CD represents the secondary current. The secondary current CD can be divided into the components ED and EC. The component ED represents the energy current to balance the primary current AC whereas the component EC is the magnetizing current reproduced as AD to form a closed triangle. As the secondary supplies the magnetizing current therefore the secondary current is larger than the primary current. The primary current AC is in phase with the voltage AB and there is no flow of wattless current from the power lines to the motor primary. The magnetizing current AD continues to lag behind the voltage AB by the angle W. It is evident that by suitable adjustment of the regulating apparatus the motor primary and secondary will each supply a desired portion of the magnetizing current. From the above discussion it is evident that the primary current does not necessarily bear any fixed relation to the secondary current under different operating conditions and that an overload relay energized strictly in proportion to the primary current would not always protect the motor. It is evident that a control current derived from the primary circuit should be modified in accordance with the operating conditions of the machine if it is to bear a true proportionate relation to the maximum load condition of the machine. In accordance with my invention I retain the simplicity of the primary derived control current so modified as to represent the true load condition of the machine irrespective of whether the limiting load condition occurs in the primary or secondary of the machine.

Fig. 3 represents a preferred embodiment of my invention when used in connection with an overload circuit breaker. In this figure, 10, 11 and 12 represent the lines of a three-phase power system, 13 represents the induction motor consisting of the primary 14 and the secondary 15 which is connected to the collector rings 16. The secondary circuit is completed by the leads 17 and the regulating apparatus 18 which represents a three-phase commutator machine driven by an induction motor 19 connected to the power lines by the switch 20. As previously mentioned, I am assuming that the object of the regulating apparatus 18 and 19 is to control the flow of wattless current from the power lines to the motor primary. 21 and 22 represent two current transformers consisting of primaries 23 and 24 and secondaries 25 and 26 respectively. I am assuming that the design and capacity of 21 and 22 are such that the ratio of their secondary currents to their primary currents will remain substantially constant throughout the motor operating range. 27 represents an impedance which may have any desired ratio of resistance to reactance. 28 represents an electrically operated control device for the motor 13 and in the description of my invention I prefer to represent 28 as a typical overload circuit breaker that may be used to simultaneously disconnect 14 from the power lines and disconnect 15 from 18. In this circuit breaker it can be seen that 29 represents stationary contacts connected to the lines, 30 represents movable switch blades carried on the arm 31 which has the projections 32 and 33. Two stationary pins are represented by 34 and 35. A spring 36 is connected to the pin 35 and the arm 31. A tripping lever 37 is fulcrumed at 38 and has a pawl end 39. Two electromagnets are preferably shown for actuating the control device 28 and forming a part of 28. These electromagnets are represented by 40 and 41 and their respective movable plungers are represented by 42 and 43. When the circuit breaker 28 is closed the spring 36 is in tension, thus creating a pressure between the pawl end 39 and projection 33 and maintaining the circuit breaker in a closed position. It is evident that when either 40 or 41 is traversed by a current of a suitable value the movable plunger 42 or 43 will be pulled inward by magnetic attraction, thus striking lever 37, causing it to rotate on its fulcrum 38 and disengage pawl end 39 from projection 33, whereupon the tension of spring 36 will cause arm 31 to move downward and open the circuits to the motor primary and secondary.

The following description considered in connection with Figs. 1, 2 and 3 will show how by means of my invention the motor primary and secondary may be protected at all operating conditions. Inspection of Figs. 1 and 2 show that the primary, secondary and magnetizing currents of an induction motor can be represented by a triangle. The magnetizing current AD lags behind the voltage AB by a constant angle W, the angular relation between the primary current AC and the voltage AB depends on the motor power factor, and the secondary current CD is always the vector sum of AC and AD. It is evident that if under all motor operating conditions I produce two separate currents whose values are similar proportions of AC and AD and whose angular relations to AB are similar to the angular relations of AC and AD to AB, then by properly combining these two separate currents I will obtain a resultant separate current whose value will be a similar proportion of the motor secondary current CD and whose angular relation to AB will be the same as that between CD and AB. To reproduce the vector AD, I connect a suitable value of impedance 27 across two of the power lines so that the current flowing through impedance 27 and hence through primary 24 lags behind the line voltage by the angle W. The current in the secondary of a transformer is in phase opposition to the current in the primary and hence the angular relation of the current in the secondary 26 to the voltage will also be represented by W. To reproduce the vector AC I connect a current transformer 21 in series with the motor primary and therefore the current in the primary 23 and hence the current in the secondary 25 will have the same angular relation to the line voltage as that existing between the motor primary current and the line voltage. By choosing suitable ratios of the primary and secondary turns in current transformers 21 and 22 the two separate currents will represent similar ratios of AC and AD respectively. By properly connecting secondaries 25 and 26 the two separate currents will be combined and will give a separate resulting current whose value will be a similar ratio of CD and whose angular relation to AB will be the same as that between CD and AB. The following description explains the circuits traversed by the currents flowing in the secondary windings 25 and 26 of the current transformers 21 and 22, respectively, in Fig. 3. It is well known to those skilled in the art to which this invention pertains that when two or more current transformers have their secondary windings connected in parallel to one or more instruments, or to one or more relay coils, the secondary current of one transformer cannot modify the secondary current of another transformer, because each transformer automatically operates to maintain the current flowing in its secondary winding at a magnitude which is substantially directly proportional to the current flowing in its primary winding, this being the inherent function and characteristic of a current transformer. It is, therefore, obvious that the current flowing in secondary winding 25 cannot modify the current flowing in secondary winding 26, and vice-versa. It is clear that when the motor primary winding 14 supplies all the magnetizing current of the machine, the primary current is greater than its magnetizing current component, and the same is mostly always true even when all the magnetizing current is supplied by the motor secondary winding 15. If all or part of the magnetizing current is supplied by the motor secondary winding 15 and a condition arises where the effective values of the motor primary current and magnetizing current component are equal, even then their instantaneous values will be different, because they are displaced in time phase. From this it follows that the current flowing in secondary winding 25 does not flow through secondary winding 26, and vice-versa, because to do so would modify their current values. Therefore, the secondary current of transformer 21 flows through the series connected circuit consisting of the coils of electromagnets 40 and 41 and secondary winding 25, whereas the secondary current of transformer 22 flows through the series connected circuit consisting of the coil of electromagnet 40 and secondary winding 26. It is, therefore, evident that the coil of electromagnet 41 is energized by a current which is substantially directly proportional to the current flowing in motor primary winding 14, and the coil of electromagnet 40 is energized by a current which is substantially directly proportional to the vector resultant of the primary current and the magnetizing current flowing in motor 13. By suitably adjusting regulating machine 18, it is possible to have all the magnetizing current flow in the motor primary winding 14, or to have all the magnetizing current flow in the motor secondary winding 15, or to have any desired portion of the magnetizing current flow in each winding. However, the total magnetizing current flowing in motor 13 is a substantially constant value, whether it flows in one motor winding or in both motor windings; hence, it should be evident that the current flowing in secondary winding 26 is always substantially directly proportional to the total magnetizing current flowing in motor 13. It is evident that when the motor primary current has reached a maximum safe value the separate current from secondary 25 traversing the control circuit consisting of electromagnet 41 will influence it and cause it to open the circuit breaker 28, thus opening the motor primary and secondary circuits. Likewise, when the motor secondary current has reached a maximum safe value the resulting current traversing the control circuit consisting of electromagnet 40 will influence it and cause it to open the circuit breaker 28 and thus open the motor primary and secondary circuits. If desired, induction motor 19 can be connected to that portion of the power lines between the circuit breaker and the primary 14 and hence the opening of the circuit breaker by either electromagnet 40 or 41 will open the circuit to the motor primary 14 and induction motor 19, thus simultaneously protecting the motor primary and secondary. It follows that the circuit breaker 28 can then be simplified by dispensing with the lower set of contacts and blades in the motor secondary circuit.

Though I have shown in Fig. 3 the impedance 27 connected to the lines 10 and 11, it will be obvious that the connections to the lines will depend on the conditions existing in the power lines and the motor. In some instances it may be necessary to have two impedances 27 of equal or unequal values connected across different power lines and two transformers 22 having the same or different ratios of secondary turns to primary turns, and such a modificaiton of my invention is shown in Fig. 4.

In Fig. 4, I show only those parts which are necessary to illustrate the modifications and as similar reference numerals represent similar parts to those shown in Fig. 3 it is unnecessary to repeat the description. It will be noted that in Fig. 4 I have connected the two secondaries 26 in series but it is obvious that in some cases it may be desirable to connect them in parallel. An oscillograph gives uniformly accurate indications for current values varying from zero to reasonably high values and whose frequency varies from zero to a reasonably high value. To determine whether part 40 in Fig. 3 is traversed by a current whose magnitude is substantially directly proportional to the motor secondary current an ammeter is connected in series with part 40 and an oscillograph is connected in series with the motor secondary. The value of the impedance 27, the connections of 27 to the power lines and the ratio of the secondary turns to the primary turns in the transformer 22 are adjusted so that the ammeter reading is of the proper proportion to the oscillograph reading, and when this adjustment is obtained the ratio of the current in part 40 to the motor secondary current will remain substantially constant.

While I have described my invention in connection with an overload circuit breaker for an induction motor having a three-phase primary and a three-phase rotating secondary concatenated with regulating apparatus, yet I wish it understood that my invention is applicable to other control devices used on any induction motor or any apparatus consisting of inductively related circuits. Also, while I have in the description of my invention shown one impedance and two current transformers and certain connections between themselves and between them and the power lines, yet I wish it understood that these are merely illustrative of the means that may be used to carry the principle of my invention into effect. Accordingly, I wish it understood that my invention is not to be limited to the exact means and connections shown and that such other modifications as fall fairly within the true spirit and scope of my invention are intended to be included within the scope of the appended claims.

What I claim as new and desire to secure by Letters Patent of the United States, is:—

1. In combination with an asynchronous dynamo electric machine having currents flowing in its relatively rotatable primary and secondary windings, means for obtaining a control current whose magnitude is substantially directly proportional to the current flowing in said primary winding, means for obtaining a control current whose magnitude is substantially directly proportional to the current flowing in said secondary winding, both of said control currents having the same frequency, a control device for said machine having two separate electromagnetically operated elements, either of which can effect the operation of the device, and connecting means between the first and second mentioned means and said control device for energizing one of said elements with one of said control currents, and for energizing the other of said elements with the other of said control currents.

2. In combination with an asynchronous dynamo electric machine having currents flowing in its relatively rotatable primary and secondary windings, means for obtaining a control current having the frequency of the current flowing in one of said windings, but having a magnitude which is substantially directly proportional to the current flowing in the other of said windings, an electrically operated control device for said machine, and connecting means between the first mentioned means and said device for energizing the latter with said control current.

3. In combination with an asynchronous dynamo electric machine having currents flowing in its relatively rotatable primary and secondary windings, means for obtaining a control current having the frequency of the current flowing in said primary winding, but having a magnitude which is substantially directly proportional to the current flowing in said secondary winding, an electrically operated control device for said machine, and connecting means between the first mentioned means and said device for energizing the latter with said control current.

4. In combination with an asynchronous dynamo electric machine having currents flowing in its relatively rotatable primary and secondary windings, means for obtaining a control current whose magnitude is substantially directly proportional to the current flowing in said primary winding, means for obtaining a control current whose magnitude is substantially directly proportional to the magnetizing current flowing in said machine, both of said control currents having the same frequency, an electrically operated device for said machine, and connecting means between the first and second mentioned means and said device for energizing the latter with the vector resultant of said control currents, said vector resultant current having a magnitude which is substantially directly proportional to the current flowing in said secondary winding.

5. In combination with an asynchronous dynamo electric machine having currents flowing in its relatively rotatable primary and secondary windings, means for obtaining two control currents whose respective magnitudes are substantially directly proportional to the currents flowing in said primary and secondary windings, a control device for said machine having two separate electromagnetically operated elements, either of which can effect the operation of the device, and connecting means between the first mentioned means and said control device for energizing one of said elements with one of said control currents, and for energizing the other of said elements with the other of said control currents.

6. In combination with an asynchronous dynamo electric machine having currents flowing in its relatively rotatable primary and secondary windings, means for obtaining a control current whose magnitude is substantially directly proportional to the current flowing in said primary winding, means for obtaining a control current having a substantially constant magnitude, both of said control currents having the same frequency, an electrically operated device for said machine, and connecting means between the first and second mentioned means and said device for energizing the latter with the vector resultant of said control currents, said vector resultant current having a magnitude which is substantially directly proportional to the current flowing in said secondary winding.

7. In combination, two inductively related circuits, a transformer, a source of alternating current connected in series with the primary winding of said transformer to one of said circuits, a second transformer having its primary winding connected in shunt relation to said source, impedance means associated with the last mentioned transformer for restricting the current flow therethrough to a magnitude which is substantially directly proportional to the magnetizing current flowing in said circuits, an electrically operated control device for said machine having two control circuits, and connecting means between the secondary windings of said transformers and said control device for energizing one of said control circuits with the current flowing in the secondary winding of the first mentioned transformer, and for energizing the other of said control circuits with the vector resultant of the currents flowing in the secondary windings of both of said transformers, said vector resultant current having a magnitude which is substantially directly proportional to the current flowing in the other of said inductively related circuits.

8. In combination with an asynchronous dynamo electric machine having currents flowing in its relatively rotatable primary and secondary windings, means for obtaining a control current whose magnitude is substantially directly proportional to the current flowing in said primary winding, means for obtaining a control current whose magnitude is substantially directly proportional to the magnetizing current flowing in said machine, both of said control currents having the same frequency, an electrically operated control device for said machine having two control circuits, and connecting means between the first and second mentioned means and said control device for energizing one of said control circuits with the first mentioned control current, and for energizing the other of said control circuits with the vector resultant of both of said control currents, said vector resultant current having a magnitude which is substantially directly proportional to the current flowing in said secondary winding.

9. In combination, an asynchronous dynamo electric machine having relatively rotatable primary and secondary windings, a current transformer, a source of alternating current connected in series with the primary winding of said transformer to the primary winding of said machine, an impedance connected across said source, a current transformer having its primary winding connected in series with said impedance, said impedance being so proportioned that the current flowing therethrough is substantially directly proportional to the magnetizing current of said machine, an electrically operated control device for said machine, and connecting means between the secondary windings of said current transformers and said control device for energizing the latter with the vector resultant of the currents flowing in the secondary windings of said transformers, said vector resultant current having a magnitude which is substantially directly proportional to the current flowing in the secondary winding of said machine.

10. In combination, an asynchronous dynamo electric machine having relatively rotatable primary and secondary windings, a current transformer, a source of alternating current connected in series with the primary winding of said transformer to the primary winding of said machine, an impedance connected across said source, a current transformer having its primary winding connected in series with said impedance, said impedance being so proportioned that the current flowing therethrough is substantially directly proportional to the magnetizing current of said machine, an electrically operated control device for said machine having two control circuits, and connecting means between the secondary windings of said transformers and said control device for energizing one of said control circuits with the current flowing in the secondary winding of the first mentioned current transformer, and for energizing the other of said control circuits with the vector resultant of the currents flowing in the secondary windings of both of said transformers, said vector resultant current having a magnitude which is substantially directly proportional to the current flowing in the secondary winding of said machine.

11. In combination with an asynchronous dynamo electric machine having currents flowing in its relatively rotatable primary and secondary windings, regulating apparatus concatinated with said secondary winding for adjusting the relative magnitudes of the magnetizing currents flowing in said primary and secondary windings, means for obtaining a control current whose magnitude is substantially directly proportional to the current flowing in said primary winding, means for obtaining a control current whose magnitude is substantially directly proportional to the sum of the magnetizing currents flowing in said primary and secondary windings, an electrically operated device for said machine, and connecting means between the first and second mentioned means and said device for energizing the latter with the vector resultant of said control currents, said vector resultant current having a magnitude which is substantially directly proportional to the current flowing in said secondary winding.

12. In combination with an asynchronous dynamo electric machine having currents flowing in its relatively rotatable primary and secondary windings, regulating apparatus concatinated with said secondary winding for adjusting the relative magnitudes of the magnetizing currents flowing in said primary and secondary windings, means for obtaining a control current whose magnitude is substantially directly proportional to the current flowing in said primary winding, means for obtaining a control current whose magnitude is substantially directly proportional to the sum of the magnetizing currents flowing in said primary and secondary windings, an electrically operated control device for said machine having two control circuits, and connecting means between the first and second mentioned means and said control device for energizing one of said control circuits with the first mentioned control current, and for energizing the other of said control circuits with the vector resultant of both of said control currents, said vector resultant current having a magnitude which is substantially directly proportional to the current flowing in said secondary winding.

13. In combination with an asynchronous dynamo electric machine having currents flowing in its relatively rotatable primary and secondary windings, means for obtaining a control current whose magnitude is substantially directly proportional to the current flowing in said primary winding, means for obtaining a control current whose magnitude is substantially directly proportional to the magnetizing current flowing in said machine, both of said control currents having the same frequency, a control device for said machine having an electromagnetically operated element, winding means surrounding said element, and connecting means between the first and second mentioned means and said winding means for energizing the latter so as to produce in said element an electromagnetic force which is substantially directly proportional to the vector resultant of said control currents.

14. In combination with an asynchronous dynamo electric machine having currents flowing in its relatively rotatable primary and secondary windings, means for obtaining a control current whose magnitude is substantially directly proportional to the current flowing in said primary winding, means for obtaining a control current whose magnitude is substantially directly proportional to the magnetizing current flowing in said machine, both of said control currents having the same frequency, a control device for said machine having two separate electromagnetically operated elements, winding means surrounding said elements, and connecting means between the first and second mentioned means and said winding means for energizing the latter so as to produce in one of said elements an electromagnetic force which is substantially directly proportional to the first mentioned control current, and for producing in the other of said elements an electromagnetic force which is substantially directly proportional to the vector resultant of both of said control currents.

15. In combination, an asynchronous dynamo electric machine having relatively rotatable primary and secondary windings, a transformer, a source of alternating current connected in series with the primary winding of said transformer to the primary winding of said machine, a transformer having its primary winding connected in shunt relation to said source, impedance means associated with the last mentioned transformer for restricting the current flow therethrough to a magnitude which is substantially directly proportional to the magnetizing current flowing in said machine, a control device for said machine having an electromagnetically operated element, winding means surrounding said element, and connecting means between the secondary windings of said transformers and said winding means for energizing the latter so as to produce in said element an electromagnetic force which is substantially directly proportional to the vector resultant of the currents flowing in the secondary windings of said transformers.

16. In combination, an asynchronous dynamo electric machine having relatively rotatable primary and secondary windings, a transformer, a source of alternating current connected in series with the primary winding of said transformer to the primary winding of said machine, a transformer having its primary winding connected in shunt relation to said source, impedance means associated with the last mentioned current transformer for restricting the current flow therethrough to a magnitude which is substantially directly proportional to the magnetizing current flowing in said machine, a control device for said machine having two separate electromagnetically operated elements, winding means surrounding said elements, and connecting means between the secondary windings of said transformers and said winding means for energizing the latter so as to produce in one of said elements an electromagnetic force which is substantially directly proportional to the current flowing in the secondary winding of the first mentioned transformer, and for producing in the other of said elements an electromagnetic force which is substantially directly proportional to the vector resultant of the currents flowing in the secondary windings of both of said transformers.

In witness whereof, I have hereunto set my hand this 17th day of October, 1929.

JOHN I. HULL.